United States Patent
Yokoi

[19]

[11] Patent Number: 6,108,186
[45] Date of Patent: Aug. 22, 2000

[54] GAME MACHINE HAVING COMMUNICATION TERMINALS

[76] Inventor: Akihiro Yokoi, c/o Kabushiki Kaisha Wiz of 42-3, Nihonbashi Hamacho 3-chome, Chuo-ku, Tokyo, Japan

[21] Appl. No.: 09/088,860

[22] Filed: Jun. 2, 1998

[30] Foreign Application Priority Data

Jun. 6, 1997 [JP] Japan .................................... 9-005358

[51] Int. Cl.[7] .................................................. H02H 3/00
[52] U.S. Cl. .......................... 361/115; 361/91.1; 361/119
[58] Field of Search .................................. 361/115, 91.1, 361/117, 118, 119; 463/40, 42, 41

[56] References Cited

U.S. PATENT DOCUMENTS

| | | | |
|---|---|---|---|
| 5,785,597 | 7/1998 | Shinohara | 463/43 |
| 5,791,993 | 8/1998 | Nakanishi | 463/42 |

FOREIGN PATENT DOCUMENTS

| | | | |
|---|---|---|---|
| 3-16703 | 4/1991 | Japan | A63F 9/22 |
| 4-170063 | 6/1992 | Japan | H01L 27/04 |
| 5-251642 | 9/1993 | Japan | H01L 27/06 |
| 6-13553 | 1/1994 | Japan | H01L 27/06 |
| 8-309032 | 11/1996 | Japan | A63F 9/22 |

*Primary Examiner*—Stephen W. Jackson
*Attorney, Agent, or Firm*—Graham & James LLP

[57] ABSTRACT

It is an object to provide a game machine having communication terminals wherein an integrated circuit portion is reliably protected from static electricity or a surge voltage input through the communication terminals without using communication terminals in a special configuration or providing an openable cap while reducing the overall cost. There is provided an integrated circuit portion 3 which includes communication terminals TA1 and TA2 provided such that they are exposed at one side of a game machine main body 1 and which transmits and receives data to and from another game machine through the communication terminals when the communication terminals TA1 and TA2 are connected to the communication terminals of another game machine. A protection circuit is provided between the integrated circuit portion 3 and communication terminals TA1 and TA2. This protection circuit includes a first diode DD1 for bypassing a current produced by a positive surge voltage and a second diode DD2 for bypassing a current produced by a negative surge voltage. The first diode DD1 and the second diode DD2 are series-connected in the forward direction, and the connecting point is connected to the communication terminals.

5 Claims, 7 Drawing Sheets

DATA 0

DATA 1

GAME MACHINE HAVING COMMUNICATION TERMINALS

BACKGROUND OF THE INVENTION

1. Field of the Invention

The present invention relates to a game machine having communication terminals provided such that they are exposed at one side of the main body of the game machine.

2. Description of the Related Art

Recently, various portable electronic game machines are proposed and sold. Conventional electronic game machines of this type have been proposed which not only allow games to be played within themselves, but also allow optical communication or direct connection to another electronic game machine through communication terminals to allow exchange of data.

Thus, such machines are characterized in that, for example, they enable the exchange of fighting data with other electronic game machines, which allow a match to be fought between the two electronic game machines and thus, increase the variety of the play to provide doubled fun.

Existing electronic game machines which perform optical communication to exchange data with another electronic game machine have a problem in that the component cost is increased because of the need for electronic components exclusively used for optical communication such as optical transmission light-emitting elements for transmitting optical signals and optical reception light-receiving elements for receiving optical signals.

Further, such existing machines have a problem in that they must incorporate an additional special communication circuit portion associated with optical communication, which increases the complexity of the circuit configuration and hence increases the cost of the electronic game machine as a whole.

On the other hand, in the case of the latter example of the prior art, the overall circuit configuration can be simplified because it exchanges data with another electronic game machine by directly connecting thereto through communication terminals, and it therefore requires neither electronic component exclusively used for optical communication nor special communication circuit portion associated with optical communication.

However, since communication terminals are normally directly connected to an IC portion (integrated circuit portion) which is formed by a multiplicity of semiconductor elements stacked on one another, it is necessary to protect the IC portion from static electricity and a surge voltage input through the communication terminals.

For this reason, some electronic game machines incorporate embedded communication terminals to prevent the communication terminals from being directly touched by the hand of a person or any substance. In some other electronic game machines, an openable cap is provided so as to cover communication terminals to prevent the communication terminals from being directly touched by hand of a person or any substance by closing the cap when the communication terminals are not used.

As described above, although use of the communication terminals allows a circuit configuration to be simplified, it has a problem in that no significant reduction in component cost can be expected when communication terminals in a special configuration are used or openable cap is provided.

SUMMARY OF THE INVENTION

The present invention has been conceived taking the above-described situation into consideration, and it is an object of the invention to provide a game machine having communication terminals wherein an integrated circuit portion is reliably protected from static electricity or a surge voltage input through the communication terminals without using communication terminals in a special configuration or providing an openable cap while reducing the overall cost.

A game machine having communication terminals according to the present invention is characterized in that it satisfies the following requirements for achieving the above-described object and other objects, and includes:

a game machine main body, communication terminals provided such that they are exposed at one side of said game machine main body, and an integrated circuit portion for transmitting and receiving data to and from another game machine through said communication terminals when said communication terminals are connected to communication terminals of another game machine, the integrated circuit portion including a control portion for controlling the progress of a game in accordance with said received data. A protection circuit is provided between said integrated circuit portion and communication terminals, the protection circuit including a first diode for bypassing a current produced by a positive surge voltage and a second diode for bypassing a current produced by a negative surge voltage such that the first diode and second diode are series-connected in the forward direction and said connecting point is connected to said communication terminals. The protection circuit includes a resistor circuit for reducing a current that flows into said integrated circuit portion, the resistor circuit provided on a communication line between said integrated circuit portion and communication terminals.

A game machine having communication terminals according to the present invention may further be characterized in that said protection circuit includes a first capacitor for absorbing static electricity, and said first capacitor is provided between said communication line and a ground.

A game machine having communication terminals according to the present invention may further be characterized in that said protection circuit includes a second capacitor for absorbing static electricity, and said second capacitor is provided between a ground and a power supply line.

A game machine having communication terminals according to the present invention may further be characterized in that said protection circuit includes a first capacitor for absorbing static electricity, and said first capacitor is provided between said communication line and a ground; and said protection circuit includes a second capacitor circuit for absorbing static electricity, and said second capacitor is provided between said ground and a power supply line.

A game machine having communication terminals according to the present invention may include a wiring process performed on a circuit region to which said integrated circuit portion is assembled for mounting a first capacitor for absorbing static electricity between said communication line and a ground later; and a wiring process performed on the circuit region to which said integrated circuit portion is assembled for mounting a second capacitor for absorbing static electricity between said earth and a power supply line later.

DETAILED DESCRIPTION OF PREFERRED EMBODIMENTS

An example of a mode for carrying out a game machine having communication terminals according to the present invention will now be described with reference to the drawings.

Figure 1:
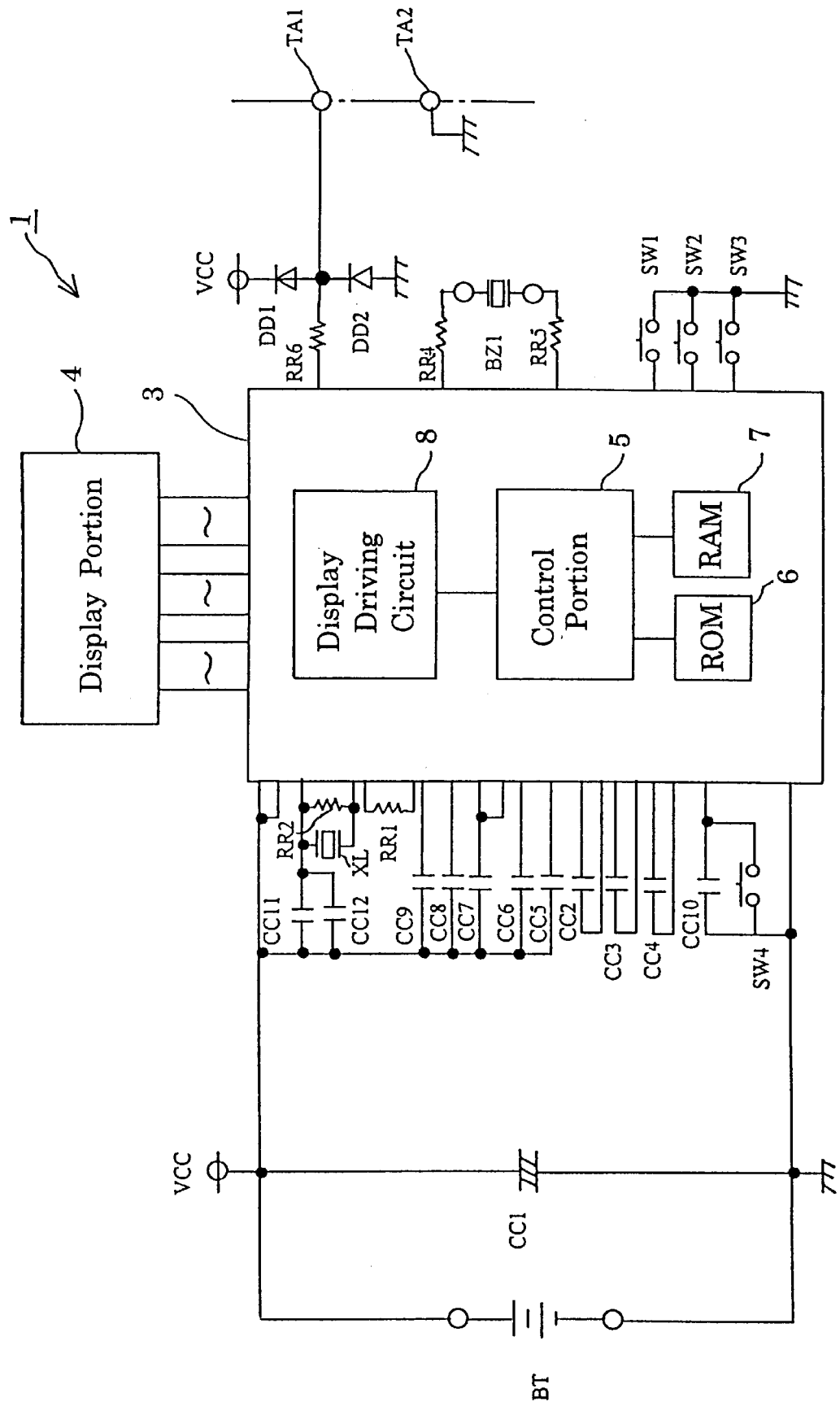
FIG. 1 is a block diagram of a major part of a game machine having communication terminals according to the present invention.
Figure 2:
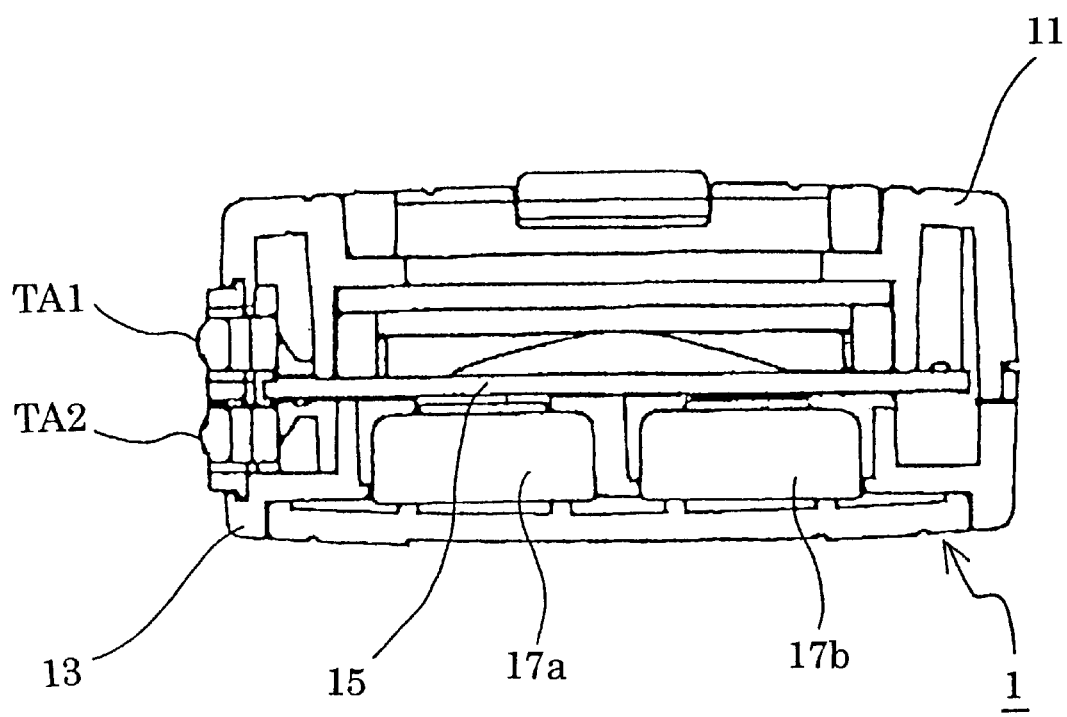
FIG. 2 is a front view of a game machine main body according to the present invention.
Figure 3:
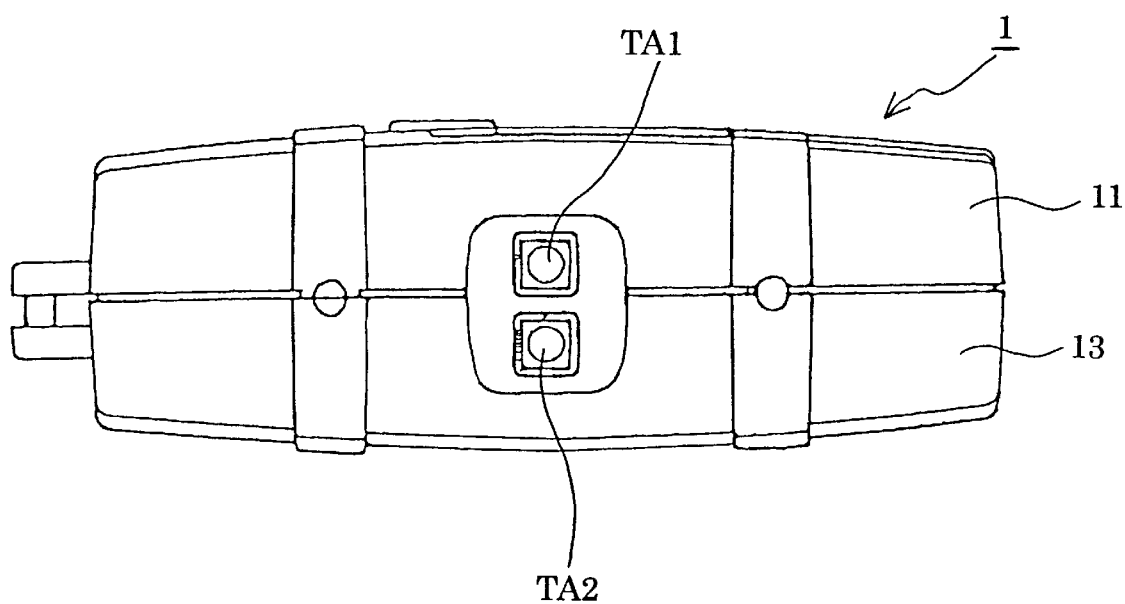
FIG. 3 is a side view of a game machine main body according to the present invention.

As shown in FIGS. 1 through 3, a game machine having communication terminals according to the present invention includes a game machine main body 1. A pair of communication terminals TA1 and TA2 are provided such that they are exposed at one side of the game machine main body 1.

The game machine main body 1 includes an integrated circuit portion 3 for transmitting and receiving data to and from another game machine through said communication terminals TA1 and TA2 when said communication terminals TA1 and TA2 are connected to communication terminals of another game machine. The integrated circuit portion 3 includes a control portion 5 for controlling the progress of a game in accordance with said received data. This control portion 5 is formed by a microcomputer and peripheral circuit portions thereof.

A protection circuit is provided between said integrated circuit portion 3 and the communication terminals TA1 and TA2. The protection circuit includes a first diode DD1 for bypassing a current produced by a positive surge voltage and a second diode DD2 for bypassing a current produced by a negative surge voltage. The first diode DD1 and the second diode DD2 are series-connected in the forward direction and said connecting point is connected to said communication terminal TA1. Said protection circuit further includes a resistor circuit RR6 for reducing a current that flows into the integrated circuit portion 3, and said resistor circuit RR6 is provided on a communication line between said integrated circuit portion 3 and the communication terminal TA1. The resistor circuit RR6 is preferably provided in the vicinity of the integrated circuit portion 3.

Figure 7:
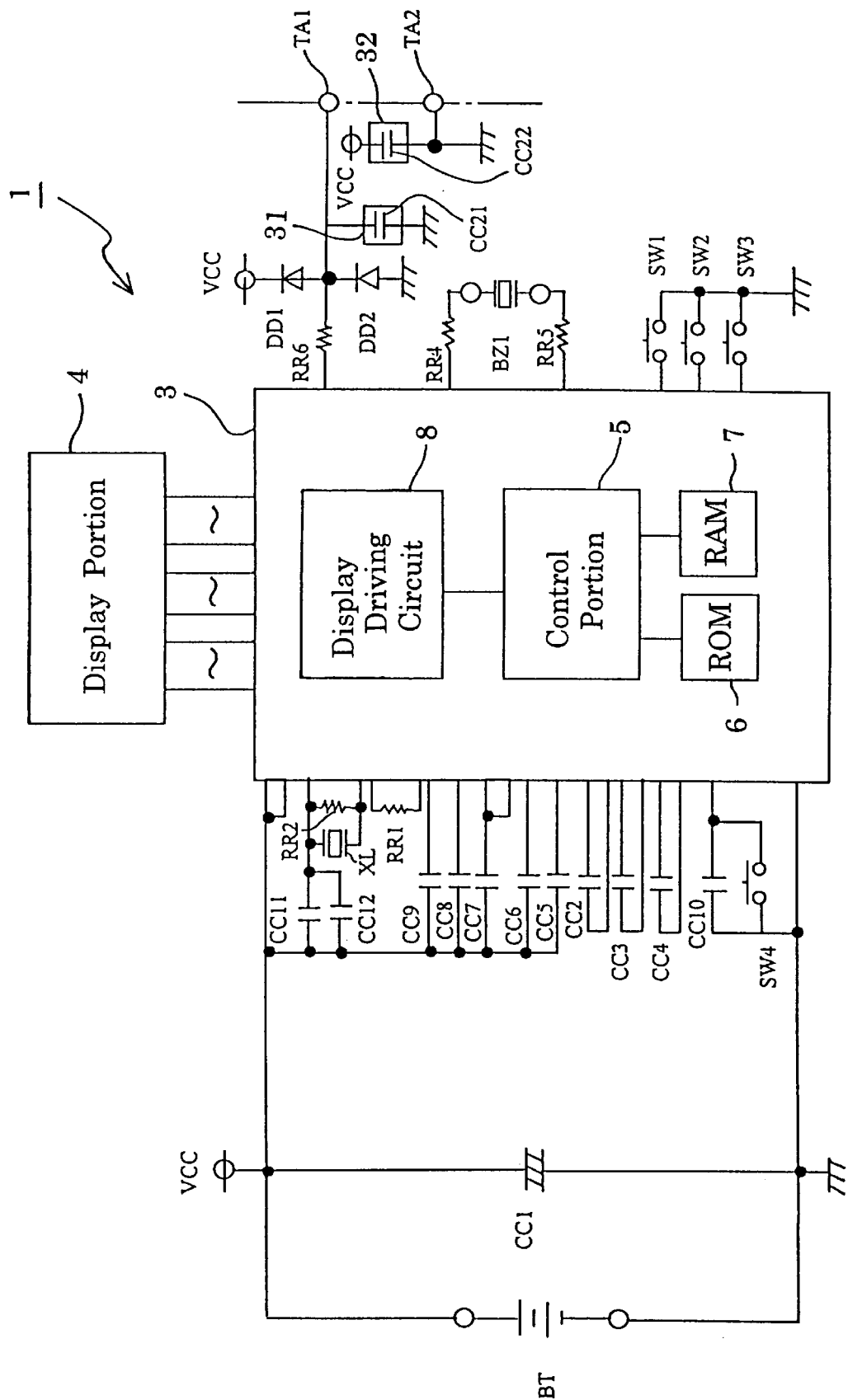
FIG. 7 is a block diagram of a major part of another embodiment of the present invention.

Further, as shown in FIG. 7 said protection circuit includes a first capacitor CC21 for absorbing static electricity, and said first capacitor CC21 is provided between said communication line and a ground. The capacitor CC21 is preferably provided in the vicinity of the communication terminal TA1.

Further, said protection circuit may include a second capacitor CC22 for absorbing static electricity, and said second capacitor CC22 is provided between ground and a power supply line. This capacitor CC22 is preferably provided in the vicinity of the communication terminal TA2.

Said protection circuit may include a first capacitor CC21 for absorbing static electricity, and said first capacitor CC21 is provided between said communication line and a ground. This capacitor CC21 is preferably provided in the vicinity of the communication terminal TA1.

Said protection circuit may also include a second capacitor CC22 for absorbing static electricity, and said second capacitor CC22 is provided between a ground and a power supply line. This capacitor CC22 is preferably provided in the vicinity of the communication terminal TA2.

A wiring process is performed on a circuit region to which said integrated circuit portion is assembled for mounting a first capacitor CC21 for absorbing static electricity between said communication line and a ground later, and a wiring process is performed on the circuit region to which said integrated circuit portion is assembled for mounting a second capacitor CC22 for absorbing static electricity between a ground and a power supply line later.

An embodiment of a game machine having communication terminals according to the present invention will now be described with reference to the drawings.

As shown in FIGS. 2 and 3, a game machine main body 1 is formed by an upper case 11 and a lower case 13. A printed board 15 is provided substantially in the middle of the game machine main body 1. This printed board 15 incorporates a circuit portion to be described in detail later. A pair of communication terminals TA1 and TA2 are provided such that they are exposed at one side of the game machine main body 1, and said pair of communication terminals TA1 and TA2 are connected to the printed board 15.

Button batteries 17a and 17b are provided in a lower part of the printed board 15. A display portion 4 (see FIG. 1) is provided in the middle of the upper side of the game machine main body 1, and a plurality of key switches SW1, SW2 and SW3 (see FIG. 1) are provided below said display portion 4.

For example, the display portion 4 is formed by a liquid crystal screen having 18 vertical dots X 29 horizontal dots and displays character images, background images and the like.

A reset switch SW4 (see FIG. 1) is provided on the rear side of the game machine main body 1. The contents of a game can be reset and returned to an initialized state by operating this reset switch SW4.

A description will now be made with reference to FIG. 1 on the circuit configuration of the printed board 15 assembled into the game machine main body 1 and the neighborhood thereof.

The integrated circuit portion 3 is provided on the printed board 15, and the integrated circuit portion 3 is connected to the display portion 4. This integrated circuit portion 3 is formed by a one-chip IC. The above-described key switches SW1, SW2 and SW3 and the reset switch SW4 are connected to the integrated circuit portion 3. Further, a battery BT, capacitors CC1 through CC12, and resistors RR1, RR2, RR4, and RR5 are connected to the integrated circuit portion 3. The battery BT is formed by button batteries 17a and 17b.

A buzzer BZ1 is connected to the integrated circuit 3 through the resistors RR4 and RR5. Further, an oscillator XL is connected to the integrated circuit portion 3 through the resistor RR2. The integrated circuit portion 3 includes a clock pulse generation circuit and a clock circuit. Specifically, the integrated circuit portion 3 performs frequency division on an oscillation frequency from the oscillator XL to generate a clock pulse in a predetermined cycle based on which time information is output.

Further, the integrated circuit portion 3 includes a control portion 5, a ROM 6, a RAM 7 and a display driving circuit 8. The ROM 6 stores programs associated with communication, various game programs for fighting games and the like, programs associated with simulation of breeding and various control data. The control portion 5 includes a microcomputer and reads the programs associated with communication, various game programs, programs associated with simulation of breeding and various control data from the ROM 6 to perform control associated with communication with another game machine and various control processes associated with games and simulation of breeding. The RAM 7 is a working memory for the above-described microcomputer. The display driving circuit 8 displays images associated with fighting games and simulation of breeding on the display portion 4 based on control commands from the control portion 5.

The above-described pair of communication terminals TA1 and TA2 are connected to the integrated circuit portion 3 through the protection circuit. The integrated circuit portion 3 transmits and receives data to and from another game machine through the communication terminals TA1 and TA2 when said communication terminals TA1 and TA2 are connected to communication terminals of another game machine. For example, in the case of a fighting game, fighting data such as vitality, power, offensive ability, defensive ability and the like are transmitted and received, and in the case of simulation of breeding, data associated with breeding are transmitted and received. The integrated circuit portion 3 includes the control portion 5 for controlling the progress of the game in accordance with received data.

A protection circuit is provided between said integrated circuit portion 3 and communication terminals TA1 and TA2. This protection circuit includes a first diode DD1 for bypassing a current produced by a positive surge voltage and a second diode DD2 for bypassing a current produced by a negative surge voltage. The first diode DD1 and the second diode DD2 are series-connected in the forward direction and said connecting point is connected to said communication terminal TA1. A cathode of the first diode DD1 is connected to a power supply line, and an anode of the second diode DD2 is connected to an earth.

Further, said protection circuit includes a resistor circuit RR6 for reducing a current that flows into the integrated circuit portion 3, and said resistor circuit RR6 is provided on a communication line between said integrated circuit portion 3 and the communication terminal TA1. The resistor circuit RR6 is preferably provided in the vicinity of the integrated circuit portion 3. For example, by setting the resistance of the resistor circuit RR6 in the range from 3 KΩ to 50 KΩ, the current flowing into the integrated circuit 3 can be reliably reduced.

The operation of the embodiment shown in FIGS. 1 through 3 will now be described.

Since the pair of communication terminals TA1 and TA2 according to the present invention are provided such that they are exposed at one side of the game machine main body 1, the hand, cloth or the like of a player can touch the pair of communication terminals TA1 and TA2 while the game is being played. When the cloth, hand or the like of a player touches the pair of communication terminals TA1 and TA2 as described above, unexpected static electricity or a surge voltage attributable to various noises can develop at the communication terminals TA1 and TA2. Especially, when static electricity develops at the communication terminals TA1 and TA2, the integrated circuit 3 can be adversely affected. Even when unexpected static electricity or a surge voltage attributable to various noises develops at the communication terminals TA1 and TA2, the integrated circuit 3 can be reliably protected by the protection circuit provided between the pair of communication terminals TA1 and TA2 and the integrated circuit 3.

First, a description will be made on an operation that occurs when a positive surge voltage is produced at the communication terminal TA1 by noises.

When a positive surge voltage is produced at the communication terminal TA1 by noises, a current resulting from said surge voltage flows from the anode of the diode DD1 to the cathode thereof by bypassing the communication line, thereby protecting the integrated circuit 3.

Although it is assumed that a very small part of said current resulting from a surge voltage flows into the integrated circuit 3 via the resistor circuit RR6, the current that flows from the communication line into the integrated circuit 3 can be reliably reduced because the resistor circuit RR6 is interposed on the communication line.

Next, a description will be made on an operation that occurs when a negative surge voltage is produced at the communication terminal TA2 by noises.

When a negative surge voltage is produced at the communication terminal TA2 by noises, a current resulting from said surge voltage flows from the anode of the diode DD2 to the cathode thereof through a ground by bypassing the communication line, thereby protecting the integrated circuit 3.

In this case, although it is assumed that a very small part of the current resulting from a surge voltage flows into the integrated circuit 3 via the resistor circuit RR6 as described above, the current that flows from the communication line into the integrated circuit 3 can be reliably reduced because the resistor circuit RR6 is interposed on the communication line. This makes it possible to protect the integrated circuit 3 reliably.

Next, a description will be made on an operation that occurs when data are transmitted and received between a pair of game machines during a fighting game played between both game machines.

Figure 4:
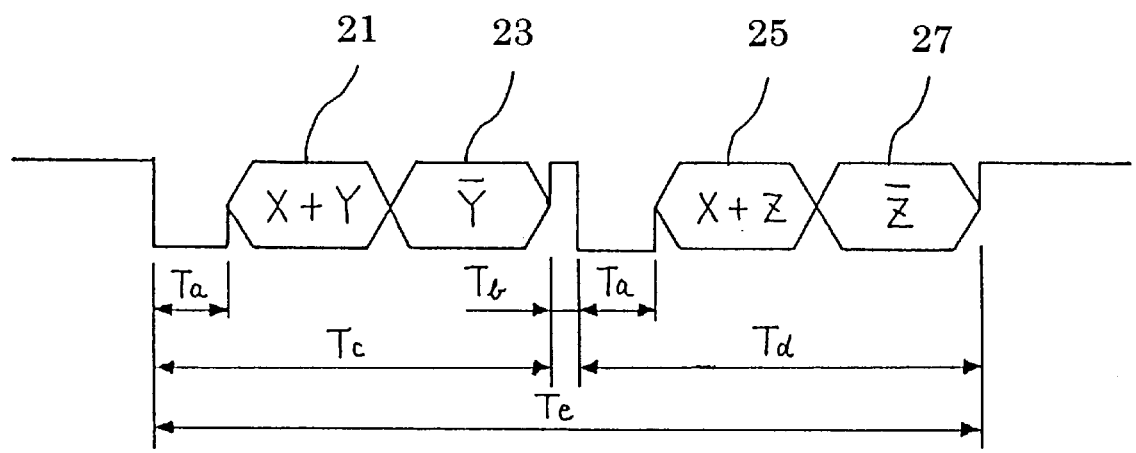
FIG. 4 is an illustration showing a format for the transmission and reception of data.

A format for data communication is set in advance as shown in FIG. 4, and the exchange of data between both game machines is carried out in accordance with this format.

Specifically, it is comprised of a start bit having a pulse width Ta set in the range from 60 to 70 mmsec, data 21 that follows said start bit, data 23 that follows said data 21, invalid time Tb set in the range from 10 to 20 mmsec, another start bit having a pulse width Ta set in the range from 60 to 70 mmsec, data 25 that follows said start bit, and data 27 that follows the data 25.

X forming a part of the data 21 represents an invalid bit constituted by the first one bit, and Y represents data having 8 bits transmitted from the transmitting end. The data 23 is an inversion of said 8-bit data Y transmitted from the transmitting end. The data 23 is used as data for checking. Z forming a part of the data 25 represents data having 8 bits received at the receiving end. The data 27 is an inversion of said 8-bit data received at the receiving end. The data 27 is used as data for checking.

The transmission time Tc and reception time Td shown in FIG. 4 are both set in the range from 130 to 150 mmsec, and overall communication time Te is set in the range from 270 to 310 mmsec.

Figure 5:
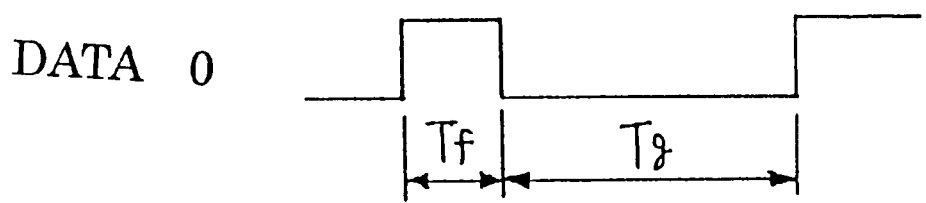
FIG. 5 is a signal waveform diagram of data 0.
Figure 6:
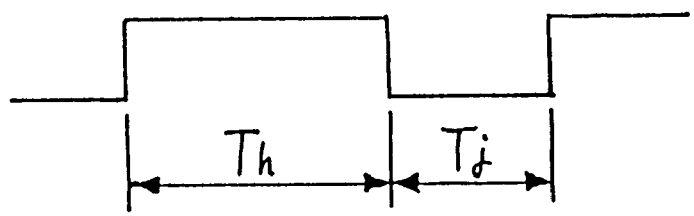
FIG. 6 is a signal waveform diagram of data 1.

Each of said data Y transmitted from the transmitting end and said data Z received at the receiving end is constituted by data in 8 bits, and the data in each bit is formed by pulses as shown in FIGS. 5 and 6. Specifically, the bit of data 0 is formed by a positive pulse having a pulse width Tf set in the range from 0.9 to 1.1 mmsec and a negative pulse having a pulse width Tg set in the range from 3.2 to 3.4 mmsec as shown in FIG. 5. The bit of data 1 is formed by a positive pulse having a pulse width Th set in the range from 2.6 to 2.8 mmsec and a negative pulse having a pulse width Tj set in the range from 1.6 to 1.8 mmsec as shown in FIG. 6.

Since the data format is configured as described above, data is transmitted and received between one of the game machines acting as the transmitting end and another game machine acting as the receiving end. Specifically, the key switch SW1, SW2 or SW3 of the one of the game machines is operated while the communication terminals of both game machines are in contact with each other to allow the transmission and reception of data with the operated game machine acting as the transmitting end. In this case, game machine at the transmitting end transmits the data 21 and 23 and receives the data 25 and 27, and the game machine at the receiving end receives the data 21 and 23 and transmits the data 25 and 27.

Another embodiment of the present invention will now be described with reference to FIG. 7.

A wiring process 31 including punching for mounting holes and patterning is performed on a circuit region between the integrated circuit portion 3 and the communication terminal TA1 such that a first capacitor CC21 for absorbing static electricity can be attached later. Similarly, a wiring process 32 including punching for mounting holes and patterning is performed between a ground and the power supply line such that a second capacitor CC22 for absorbing static electricity can be attached later.

The configuration not mentioned above is otherwise similar to that shown in FIG. 1, and like reference numbers are given and description will be omitted for such a like configuration.

The protection circuit in the embodiment shown in FIG. 7 can be adjusted depending on the situation. Specifically, in a normal state, the capacitors CC1 and CC2 are not attached and only the diodes DD1 and DD2 and the resistor circuit RR6 are attached. Only when the diodes DD1 and DD2 and the resistor circuit RR6 are insufficient, i.e., only when they can not eliminate static electricity produced at the communication terminals TA1 and TA2 sufficiently, the capacitor CC21 is added to the wiring process 31, or the second capacitor CC22 is added to the wiring process 32, or both of the capacitors CC1 and CC2 are added later.

Since it is thus possible to add the capacitor CC21 or CC22 later, the protection circuit can be adjusted depending on the situation.

As described above, the invention provides a protection circuit between an integrated circuit portion and communication terminals. This protection circuit includes a first diode for bypassing a current produced by a positive surge voltage and a second diode for bypassing a current produced by a negative surge voltage. The first diode and the second diode are series-connected in the forward direction, and said connecting point is connected to the communication terminals. Further, the protection circuit has a configuration that includes a resistor circuit for reducing a current flowing into the integrated circuit portion. As a result, even when unexpected static electricity or a surge voltage due to various noises is produced at the communication terminals, the protection circuit provided between the pair of communication terminals and the integrated circuit has an effect that it protects the integrated circuit reliably.

Further, when the configuration includes a first capacitor for absorbing static electricity provided between a communication line and a ground, there is an effect in that static electricity produced at the communication terminals can be reliably absorbed to provide more reliable protection of the integrated circuit.

Further, when the configuration includes a second capacitor for absorbing static electricity provided between a ground and the power supply line, there is an effect in that static electricity produced at the communication terminals can be reliably absorbed to provide more reliable protection of the integrated circuit.

Further, a circuit region to which the integrated circuit portion is assembled has a configuration wherein a wiring process is performed to allow a first capacitor for absorbing static electricity to be attached between the communication line and a ground later and wherein a wiring process is performed to allow a second capacitor for absorbing static electricity to be attached between a ground and the power supply line later. This provides an effect that capacitors for absorbing static electricity can be additionally attached later to allow more reliable protection of the integrated circuit through adjustment of the protection circuit depending on the situation.

Thus, it is seen that a game machine having communication terminals is provided. One skilled in the art will appreciate that the present invention can be practiced by other than the preferred embodiments which are presented for purpose of illustration, and not of limitation, and the present invention is limited only by the claims which follow.

What is claimed is:

1. A game machine having communication terminals characterized in that:
    (a) it includes a game machine main body;
    (b) it includes communication terminals provided such that they are exposed at one side of said game machine main body;
    (c) said game machine main body includes an integrated circuit portion for transmitting and receiving data to and from another game machine through said communication terminals when said communication terminals are connected to communication terminals of another game machine;
    (d) said integrated circuit portion includes a control portion for controlling the progress of a game in accordance with said received data;
    (e) a protection circuit is provided between said integrated circuit portion and communication terminals;
    (f) said protection circuit includes a first diode for bypassing a current produced by a positive surge voltage;
    (g) said protection circuit includes a second diode for bypassing a current produced by a negative surge voltage;
    (h) said first diode and second diode are series-connected in the forward direction and said connecting point is connected to said communication terminals;
    (i) said protection circuit includes a resistor circuit for reducing a current that flows into said integrated circuit portion; and
    (j) said resistor circuit is provided on a communication line between said integrated circuit portion and communication terminals.

2. A game machine having communication terminals characterized in that:
    (a) it includes a game machine main body;
    (b) it includes communication terminals provided such that they are exposed at one side of said game machine main body;
    (c) said game machine main body includes an integrated circuit portion for transmitting and receiving data to and from another game machine through said communication terminals when said communication terminals are connected to communication terminals of another game machine;
    (d) said integrated circuit portion includes a control portion for controlling the progress of a game in accordance with said received data;

(e) a protection circuit is provided between said integrated circuit portion and communication terminals;

(f) said protection circuit includes a first diode for bypassing a current produced by a positive surge voltage;

(g) said protection circuit includes a second diode for bypassing a current produced by a negative surge voltage;

(h) said first diode and second diode are series-connected in the forward direction and said connecting point is connected to said communication terminals;

(i) said protection circuit includes a resistor circuit for reducing a current that flows into said integrated circuit portion;

(j) said resistor circuit is provided on a communication line between said integrated circuit portion and communication terminals; and (k) said protection circuit includes a first capacitor for absorbing static electricity, and said first capacitor is provided between said communication line and a ground.

3. A game machine having communication terminals characterized in that:

(a) it includes a game machine main body;

(b) it includes communication terminals provided such that they are exposed at one side of said game machine main body;

(c) said game machine main body includes an integrated circuit portion for transmitting and receiving data to and from another game machine through said communication terminals when said communication terminals are connected to communication terminals of another game machine;

(d) said integrated circuit portion includes a control portion for controlling the progress of a game in accordance with said received data;

(e) a protection circuit is provided between said integrated circuit portion and communication terminals;

(f) said protection circuit includes a first diode for bypassing a current produced by a positive surge voltage;

(g) said protection circuit includes a second diode for bypassing a current produced by a negative surge voltage;

(h) said first diode and second diode are series-connected in the forward direction and said connecting point is connected to said communication terminals;

(i) said protection circuit includes a resistor circuit for reducing a current that flows into said integrated circuit portion;

(j) said resistor circuit is provided on a communication line between said integrated circuit portion and communication terminals; and (k) said protection circuit includes a second capacitor for absorbing static electricity, and said second capacitor is provided between a ground and a power supply line.

4. A game machine having communication terminals characterized in that:

(a) it includes a game machine main body;

(b) it includes communication terminals provided such that they are exposed at one side of said game machine main body;

(c) said game machine main body includes an integrated circuit portion for transmitting and receiving data to and from another game machine through said communication terminals when said communication terminals are connected to communication terminals of another game machine;

(d) said integrated circuit portion includes a control portion for controlling the progress of a game in accordance with said received data;

(e) a protection circuit is provided between said integrated circuit portion and communication terminals;

(f) said protection circuit includes a first diode for bypassing a current produced by a positive surge voltage;

(g) said protection circuit includes a second diode for bypassing a current produced by a negative surge voltage;

(h) said first diode and second diode are series-connected in the forward direction and said connecting point is connected to said communication terminals;

(i) said protection circuit includes a resistor circuit for reducing a current that flows into said integrated circuit portion;

(j) said resistor circuit is provided on a communication line between said integrated circuit portion and communication terminals;

(k) said protection circuit includes a first capacitor for absorbing static electricity, and said first capacitor is provided between said communication line and a ground; and (l) said protection circuit includes a second capacitor circuit for absorbing static electricity, and said second capacitor is provided between said earth and a power supply line.

5. A game machine having communication terminals characterized in that:

(a) it includes a game machine main body;

(b) it includes communication terminals provided such that they are exposed at one side of said game machine main body;

(c) said game machine main body includes an integrated circuit portion for transmitting and receiving data to and from another game machine through said communication terminals when said communication terminals are connected to communication terminals of the other game machine;

(d) said integrated circuit portion includes a control portion for controlling the progress of a game in accordance with said received data;

(e) a protection circuit is provided between said integrated circuit portion and communication terminal;

(f) said protection circuit includes a first diode for bypassing a current produced by a positive surge voltage;

(g) said protection circuit includes a second diode for bypassing a current produced by a negative surge voltage;

(h) said first diode and second diode are series-connected in the forward direction and said connecting point is connected to said communication terminals;

(i) said protection circuit includes a resistor circuit for reducing a current that flows into said integrated circuit portion;

(j) said resistor circuit is provided on a communication line between said integrated circuit portion and communication terminals;

(k) a wiring process is performed on a circuit region to which said integrated circuit portion is assembled for mounting a first capacitor for absorbing static electricity between said communication line and a ground later; and (l) a wiring process is performed on the circuit region to which said integrated circuit portion is assembled for mounting a second capacitor for absorbing static electricity between said earth and a power supply line later.

* * * * *